US009529705B2

(12) United States Patent
Kim et al.

(10) Patent No.: US 9,529,705 B2
(45) Date of Patent: Dec. 27, 2016

(54) NONVOLATILE MEMORY SYSTEM INCLUDING NONVOLATILE MEMORY DEVICE AND MEMORY CONTROLLER THAT LOADS A MAPPING TABLE ON A SUB-BITMAP AND METHOD OF OPERATING THE MEMORY CONTROLLER

(71) Applicants: Hyun-Cheol Kim, Suwon-Si (KR);
Jinyeong Kim, Suwon-Si (KR);
Dae-Hoon Jang, Hwaseong-Si (KR)

(72) Inventors: Hyun-Cheol Kim, Suwon-Si (KR);
Jinyeong Kim, Suwon-Si (KR);
Dae-Hoon Jang, Hwaseong-Si (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 0 days.

(21) Appl. No.: 14/619,142

(22) Filed: Feb. 11, 2015

(65) Prior Publication Data

US 2015/0324284 A1 Nov. 12, 2015

(30) Foreign Application Priority Data

May 12, 2014 (KR) ........................ 10-2014-0056640

(51) Int. Cl.
*G06F 13/00* (2006.01)
*G06F 12/02* (2006.01)
*G06F 3/06* (2006.01)

(52) U.S. Cl.
CPC ........... *G06F 12/02* (2013.01); *G06F 12/0246* (2013.01); *G06F 3/0652* (2013.01); *G06F 12/0253* (2013.01); *G06F 2212/7201* (2013.01); *G06F 2212/7205* (2013.01)

(58) Field of Classification Search
CPC .................. G06F 12/02; G06F 12/0246; G06F 2212/7201; G06F 2212/7205; G06F 12/0253; G06F 3/0652
USPC .......................... 707/693; 711/202, 206, 103
See application file for complete search history.

(56) References Cited

U.S. PATENT DOCUMENTS

| 6,000,006 | A  | 12/1999 | Bruce et al. |
| 6,944,060 | B2 | 9/2005  | Honda et al. |
| 8,180,953 | B2 | 5/2012  | Chu |
| 8,307,149 | B2 | 11/2012 | Honda et al. |
| 8,397,014 | B2 | 3/2013  | Khmelnitsky et al. |
| 8,484,409 | B2 | 7/2013  | Honda |
| 2005/0262306 | A1 | 11/2005 | Nenov et al. |

(Continued)

FOREIGN PATENT DOCUMENTS

KR 10-0921282 B1 10/2009
KR 10-2013-0044657 A 5/2013

(Continued)

*Primary Examiner* — Hong Kim
(74) *Attorney, Agent, or Firm* — Volentine & Whitt, PLLC

(57) ABSTRACT

A method of operating a memory controller controlling a nonvolatile memory device including a user area and a meta area is provided. The method includes selecting a source block among a plurality of memory blocks included in the user area, loading a mapping table stored in the meta area on the basis of a sub-bitmap of the selected source block, and generating a valid page layout constituted by valid pages among pages included in the source block on the basis of the loaded mapping table. The sub-bitmap includes information of a valid mapping table with respect to the selected source block.

20 Claims, 16 Drawing Sheets

(56) References Cited

U.S. PATENT DOCUMENTS

| | | | |
|---|---|---|---|
| 2007/0300037 A1 | 12/2007 | Rogers et al. | |
| 2008/0155317 A1* | 6/2008 | Kim | G11C 29/76 714/6.13 |
| 2011/0055458 A1* | 3/2011 | Kuehne | G06F 12/0246 711/103 |
| 2012/0284587 A1* | 11/2012 | Yu | G06F 3/0608 714/773 |
| 2013/0103884 A1 | 4/2013 | Cho | |
| 2013/0132650 A1* | 5/2013 | Choi | G06F 12/02 711/103 |
| 2013/0151754 A1* | 6/2013 | Post | G06F 12/0246 711/103 |
| 2013/0275660 A1* | 10/2013 | Bennett | G06F 12/0292 711/103 |

FOREIGN PATENT DOCUMENTS

| | | |
|---|---|---|
| KR | 10-2013-0051032 A | 5/2013 |
| KR | 10-1284465 B1 | 7/2013 |

* cited by examiner

NONVOLATILE MEMORY SYSTEM INCLUDING NONVOLATILE MEMORY DEVICE AND MEMORY CONTROLLER THAT LOADS A MAPPING TABLE ON A SUB-BITMAP AND METHOD OF OPERATING THE MEMORY CONTROLLER

CROSS-REFERENCE TO RELATED APPLICATIONS

A claim of priority under 35 U.S.C. §119 is made to Korean Patent Application No. 10-2014-0056640, filed on May 12, 2014, the entire contents of which are hereby incorporated by reference.

BACKGROUND

The present inventive concept relates to a semiconductor memory, and more particularly, to a nonvolatile memory system including a nonvolatile memory device and a memory controller, and a method of operating the memory controller.

Semiconductor memory devices may be embodied using semiconductor material such as silicon Si, germanium Ge, gallium arsenide GaAs, indium phosphide InP, and so on. Semiconductor memory devices may be classified into volatile semiconductor memory devices and nonvolatile semiconductor memory devices.

Volatile memory devices lose stored data when power supply is interrupted. Examples of volatile memory devices include static RAMs (SRAM), dynamic RAMs (DRAM), synchronous DRAMs (SDRAM), and so on. Nonvolatile memory devices retain stored data even when power supply is interrupted. Examples of nonvolatile memory devices include read only memories (ROM), programmable ROMs (PROM), electrically programmable ROMs (EPROM), electrically erasable and programmable ROMs (EEPROM), flash memory, phase change RAMs (PRAM), magnetic RAMs (MRAM), resistive RAMs (RRAM), ferroelectric RAMs (FRAM), and so on.

Since flash memory has advantages such as a low noise, low power and high operation speed, flash memory is used in various fields. For example, mobile systems such as smart phones and tablet PCs utilize large-capacity flash memory. In flash memory, read and write operations of data are performed by a page unit, and erase operations are performed by a block unit. Flash memory systems may typically use a flash translation layer (FTL). The FTL performs a function of translating a logical address defined by a host (e.g., AP) into a physical address that can be used in the flash memory. The FTL performs an address translation operation based on a mapping table. The FTL can perform other operations such as garbage collection operations, merge operations and wear leveling, and so on.

SUMMARY

Embodiments of the inventive concept provide an operating method for a memory controller that controls a nonvolatile memory device including a user area and a meta area. The operating method may include selecting a source block among a plurality of memory blocks included in the user area, loading a mapping table stored in the meta area on the basis of a sub-bitmap of the selected source block, and generating a valid page layout constituted by valid pages among pages included in the source block on the basis of the loaded mapping table. The sub-bitmap may include information of a valid mapping table with respect to the selected source block.

In embodiments of the inventive concept, the operating method may further include selecting a destination block among the memory blocks included in the user area, and performing a garbage collection operation with respect to the source block and the destination block on the basis of the generated valid page layout.

In embodiments of the inventive concept, the loaded mapping table may include mapping information between a logical address of data stored in the valid page and a physical address of the source blocks.

In embodiments of the inventive concept, the loading of the mapping table stored in the meta area on the basis of the sub-bitmap of the selected source block may include loading a part of the mapping table which is valid with respect to the selected source block in the mapping table stored in the meta area.

In embodiments of the inventive concept, the generation of the valid page layout on the basis of the loaded mapping table may include comparing physical addresses included in the loaded mapping table with physical addresses of pages included in the source block.

In embodiments of the inventive concept, the generation of the valid page layout on the basis of the loaded mapping table may further include, when at least one physical address among the physical addresses of the pages included in the source block is included in the loaded mapping table, generating the valid page layout so that at least one physical address can be included in the valid page layout.

In embodiments of the inventive concept, the operating method may further include updating a sub-bitmap of at least one memory block, when data is written in at least one memory block among the memory blocks, when data included in at least one memory block is invalid, or when at least one memory block is erased.

Embodiments of the inventive concept provide a nonvolatile memory system including a nonvolatile memory device and a memory controller. The nonvolatile memory device may include a user area and a meta area. The user area may store user data and include a plurality of memory blocks. The meta area may store a mapping table and a bitmap. The memory controller may select a source block among the plurality of memory blocks, load a part of the mapping table on the basis of the selected source block, and generate a valid page layout constituted by valid pages among pages included in the source block on the basis of the loaded mapping table. The mapping table may include a plurality of sub-mapping tables. The bitmap may include a plurality of sub-bitmaps.

In embodiments of the inventive concept, the memory controller may select a destination block among the memory blocks, and may copy data in the valid pages of the source block to the destination block on the basis of the generated valid page layout.

In embodiments of the inventive concept, the memory controller may control the nonvolatile memory device so that after the valid pages of the source block are copied to the destination block, the source block can be erased.

In embodiments of the inventive concept, when at least one memory block among the memory blocks is updated, the memory controller may update a sub-bitmap of at least one memory block.

In embodiments of the inventive concept, when a part of the mapping table becomes a valid mapping table with respect to the updated memory block, the memory controller may update a sub-bitmap of the updated memory block so that valid information of the valid mapping table can be included in the sub-bitmap of the updated memory block.

In embodiments of the inventive concept, when a part of the mapping table becomes an invalid mapping table with respect to the updated memory block, the memory controller may update a sub-bitmap of the updated memory block so that valid information of the invalid mapping table cannot be included in the sub-bitmap of the updated memory block.

In embodiments of the inventive concept, the memory controller may flush the updated sub-bitmap to the meta area during a background operation.

In embodiments of the inventive concept, the memory controller may compare physical addresses included in the loaded mapping table with physical addresses of the source block in order to generate the valid page layout based on the comparison result.

Embodiments of the inventive concept provide a nonvolatile memory system including a nonvolatile memory device and a memory controller. The nonvolatile memory device may include a user area and a meta area. The user area may include a plurality of memory blocks. The memory controller may control the nonvolatile memory device. The user area may be an area storing user data, and the meta area may be an area storing a mapping table and a bitmap. The mapping table may include a plurality of sub-mapping tables, and the bitmap may comprise a plurality of sub-bitmaps. Each of the plurality of sub-bitmaps may include valid information of the sub-mapping tables with respect to a corresponding memory block among the memory blocks of the user area. The memory controller may load a part of the sub-mapping tables on the basis of a sub-bitmap corresponding to at least one memory block among the memory blocks, and may generate a valid page layout constituted by valid pages among a plurality of pages included in at least one memory block on the basis of the loaded sub-mapping table.

In embodiments of the inventive concept, the memory controller may load a part of the sub-mapping tables from the meta area.

In embodiments of the inventive concept, the sub-mapping tables may include information on mapping between a logical address received from an external device and a physical address of a plurality of pages of the memory blocks.

In embodiments of the inventive concept, the memory controller may select a destination block among the memory blocks, and may copy the valid page among the pages to the destination block on the basis of the valid page layout.

In embodiments of the inventive concept, after completing the copy operation of the valid page, the memory controller may erase at least one memory block among the memory blocks.

BRIEF DESCRIPTION OF THE FIGURES

Embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION

Figure 1:
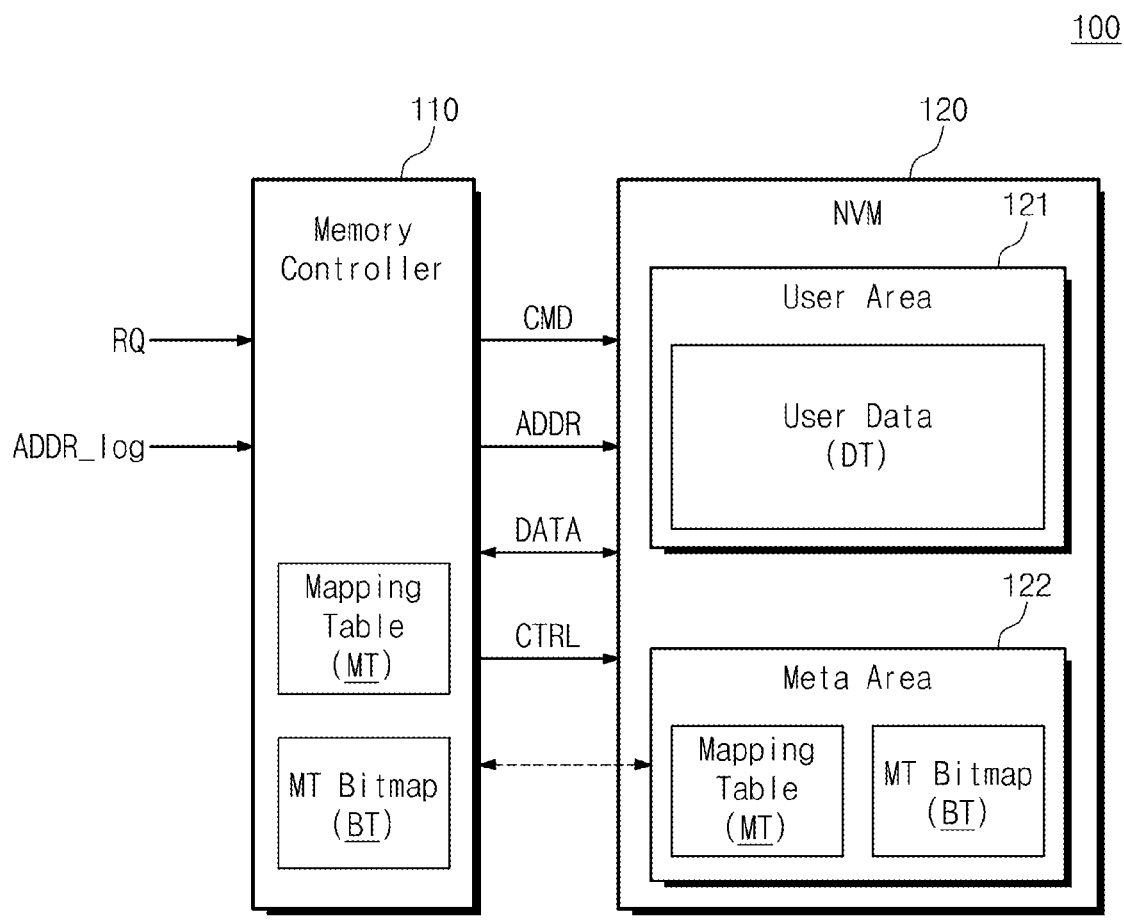
FIG. 1 is a block diagram illustrating a nonvolatile memory system in accordance with embodiments of the inventive concept.

Detailed example embodiments of the inventive concept are disclosed herein. However, specific structural and functional details disclosed herein are merely representative for purposes of describing example embodiments of the inventive concept. Example embodiments of the inventive concept may, however, be embodied in many alternate forms and should not be construed as limited to only the embodiments set forth herein.

Accordingly, while example embodiments of the inventive concept are capable of various modifications and alternative forms, embodiments thereof are shown by way of example in the drawings and will herein be described in detail. It should be understood, however, that there is no intent to limit example embodiments of the inventive concept to the particular forms disclosed, but to the contrary, example embodiments of the inventive concept are to cover all modifications, equivalents, and alternatives falling within the scope of example embodiments of the inventive concept. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A memory controller in accordance with some embodiments of the inventive concept performs a garbage collection operation to secure a free block of a nonvolatile memory device. At this time, the memory controller can generate an effective page layout on the basis of effective information of a mapping table including information on mapping between a logical page number and a physical page number without scanning a spare area of a source block in which a garbage collection will be performed. Thus, since overhead (for example, overhead caused by an error correction operation) that may occur due to a scan of the spare area of the source block is reduced, an operation method of a memory controller having improved performance is provided.

FIG. 1 is a block diagram illustrating a nonvolatile memory system in accordance with embodiments of the inventive concept. Referring to FIG. 1, a nonvolatile memory system 100 may include a memory controller 110 and a nonvolatile memory device 120. The memory controller 110 and the nonvolatile memory device 120 may be provided by different chips, different packages and different modules, respectively. The memory controller 110 and the nonvolatile memory device 120 can be electrically connected to each other. The memory controller 110 and the nonvolatile memory device 120 can be packaged according to any of various packaging technologies such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi-chip package (MCP), wafer-level fabricated package (WFP), or wafer-level processed stack package (WSP) to be provided as the nonvolatile memory system.

The memory controller 110 can receive a request RQ and an address ADDR_log from an external device (e.g., host, application processor, etc.), and can control the nonvolatile memory device 120 in response to the received signal. For example, the memory controller 110 can transmit a command CMD, an address ADDR and a control signal CTRL to the nonvolatile memory device 120 in order to write data in the nonvolatile memory device 120 or read data stored in the nonvolatile memory device 120.

In exemplary embodiments, the address ADDR_log received from an external device may be a logical address, and the address ADDR transmitted to the nonvolatile memory device 120 may be a physical address. The logical address may indicate location information of a data unit that is defined or managed by the external device. The physical address may indicate location information of a data unit defined according to an operation characteristic of the nonvolatile memory device 120. The memory controller 120 can translate the logical address to the physical address. The memory controller 120 can manage the address translation information on the basis of a mapping table MT.

The nonvolatile memory device 120 can write data received from the memory controller 110 or transmit stored data to the memory controller 110 under control of the memory controller 110. It will be assumed that the nonvolatile memory device 120 includes NAND flash memories. However, the inventive concept is not limited thereto, and the nonvolatile memory device 120 may include nonvolatile memory devices such as a NAND flash, a PRAM, an ReRAM, an MRAM and a FRAM that have a three-dimensional structure.

The nonvolatile memory device 120 may include a user area 121 and a meta area 122. The user area 121 may indicate an area in which user data DT is stored, and the metal area 122 may indicate an area in which a mapping table MT and a bitmap BT are stored. The user data DT may indicate data being used or generated in a software layer of an external device.

Information (i.e., the mapping table MT and the bitmap BT) stored in the meta area 122 may be meta data, and may include structured information of the user data DT stored in the user area 121. For example, the mapping table MT may include a plurality of sub-mapping tables. Each of the plurality of sub-mapping table may include address translation information of the user data DT stored in the user area 121.

The bitmap BT may include a plurality of sub-bitmaps. Each of the plurality of sub-bitmaps may include location information (or effective information) of mapping tables effective for the user data DT. For example, the plurality of sub-bitmaps may be managed to correspond to a plurality of memory blocks included in the user area 121, respectively. A first sub-bitmap corresponding to a first memory block included in the user area 121 may include 1-bit logical values corresponding to each of the plurality of sub-mapping tables.

Validity of each sub-mapping table with respect to the first memory block may be determined based on the logical values included in the first sub-bitmap. For example, in case that mapping information of a first page included in the first memory block is included in a first sub-mapping table, a logical value corresponding to the first sub-mapping table among the logical values included in the first sub-bitmap may be set to have a logical value of logic high.

For brevity of description, although a constitution that one sub-bitmap corresponds to one memory block is described, but the inventive concept is not limited thereto. One sub-bitmap may be managed to correspond to units such as one memory block, one sub-block, one super-block, one word line, one page, and so on.

In exemplary embodiments, the meta area 122 may store other information besides the mapping table MT and the bitmap BT. The mapping table MT and the bitmap BT will be described in detail with reference to following drawings.

In exemplary embodiments, data which the memory controller 110 exchanges with the nonvolatile memory device 120 may include the user data DT, the mapping table MT and the bitmap BT.

In exemplary embodiments, the nonvolatile memory device 120 can program the user data DT in the user area 121 on the basis of a multi-level cell program method. The nonvolatile memory device 120 can program data in the meta area 122 on the basis of a single level cell program method in order to improve reliability of data stored in the meta area 122. That is, the data stored in the meta area 122 may have higher reliability than data stored in the user area 121.

The memory controller 110 may read the mapping table MT and the bitmap BT stored in the meta area 122, and then may perform an address translation operation based on the read mapping table MT and the bitmap BT. The memory controller 110 may perform a garbage collection GC on the basis of the mapping table MT and the bitmap BT.

In exemplary embodiments, the memory controller 110 may update the mapping table MT and the bitmap BT, and may flush the updated mapping table MT and the updated bitmap BT to the nonvolatile memory device 120. A flush operation of the memory controller 110 can be performed during an idle state or a background operation of the nonvolatile memory system 100.

Figure 2:
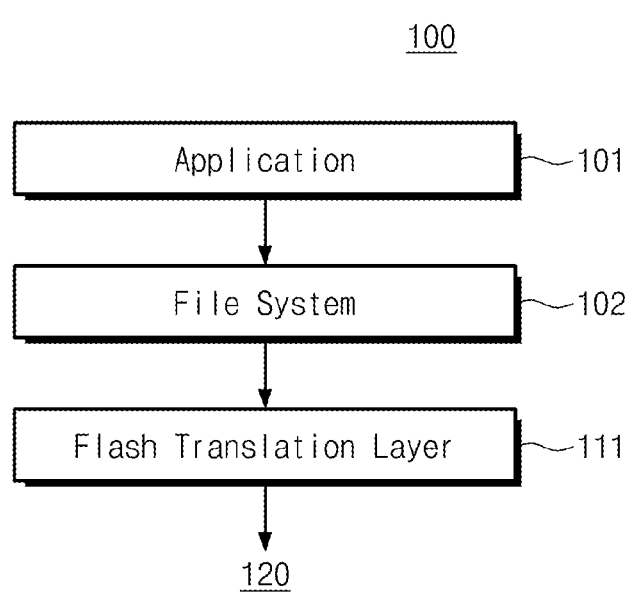
FIG. 2 is a block diagram illustrating a software layer of an external device and the nonvolatile memory system illustrated in FIG. 1.

FIG. 2 is a block diagram illustrating a software layer of an external device and the nonvolatile memory system illustrated in FIG. 1. Referring to FIGS. 1 and 2, the software layer of the nonvolatile memory system 100 and an external device may include an application 101, a file system 102, and a flash translation layer (FTL) 111. The application 101 may indicate various application programs driven in an external device. For example, the application 101 may include an operating system, a text editor, a web browser, an image player, a game program, and so on.

In case that a file or data used by the application 101 is stored in the nonvolatile memory device 120, the file system 102 may perform a function of organizing a file or data. The file system 102 can provide a logical address ADDR_log of the file or the data to the nonvolatile memory system 100. The file system 102 may have a different form depending on an operating system OS of the external device. For example, the file system 102 may include a file allocation table (FAT), an FAT32, an NT file system (NTFS), a hierarchical file system (HFS), a journaled file system2 (JSF2), an XFS, an on-disk structure-5 (ODS-5), a UDF, a ZFS, a unix file system (UFS), an ext2, an ext3, an ext4, a resistorFS, a reiser4, ISO 9550, a Gnome VFS, a BFS, or WinFS. In exemplary embodiments, the file system 102 can be defined the file or the data by a sector unit. The file system 102 can be driven by the external device.

The flash translation layer (FTL) 111 may provide an interface between an external device and the nonvolatile memory device 120 so that the nonvolatile memory device 120 can be effectively used. For example, the nonvolatile memory device 120 can read and write data by a page unit. Since the file system 102 manages data or a file by a sector unit, the FTL 111 may receive a logical address ADDR_log in order to translate the received logical address ADDR-log into a physical address ADDR that can be used in the nonvolatile memory device 120. The FTL 111 may manage the address translation operation through the mapping table MT.

The FTL 111 can perform an operation such as a garbage collection GC, a wear leveling, and so on. For example, the FTL 111 may manage the number of program/erase (P/E) cycles of a plurality of memory blocks included in the nonvolatile memory device 120, and may perform the wear leveling so that the number of P/E cycles of the memory blocks can be equalized. The FTL 111 can perform a garbage collection operation of programming valid data among data included in at least one memory block in a free memory block and erasing at least one memory block.

Figure 3:
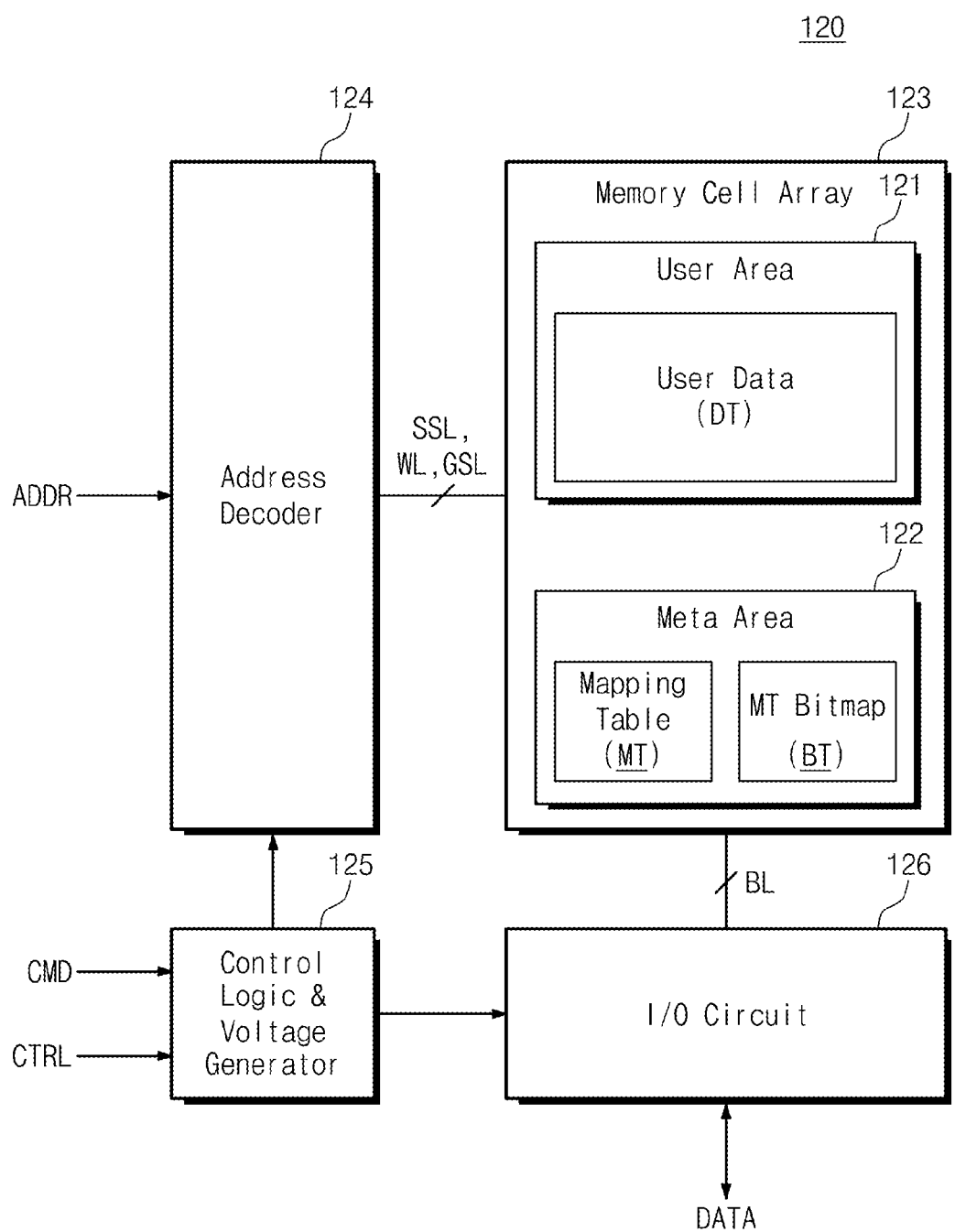
FIG. 3 is a block diagram illustrating a nonvolatile memory device illustrated in FIG. 1 in detail.

FIG. 3 is a block diagram illustrating a nonvolatile memory device illustrated in FIG. 1 in detail. Referring to FIGS. 1 and 3, the nonvolatile memory device 120 may include a memory cell array 123, an address decoder 124, a control logic & voltage generator 125, and an input/output circuit 126.

The memory cell array 123 may include the user area 121 and the meta area 122. The user area 121 may include user data DT, and the meta area 122 may include the mapping table MT and the bitmap BT.

Each of the user area 121 and the meta area 122 may include a plurality of memory blocks. Each of the plurality of memory blocks may include a plurality of pages, and each of the plurality of pages may include a plurality of memory cells. Memory cells included in the user area 121 may be a multi-level cell storing at least 2-bit data, and memory cells included in the meta area 122 may be a single level cell SLC storing 1-bit data.

The address decoder 124 may be connected to the memory cell array 123 through string select lines SSL, a plurality of word lines WL and ground select lines GSL. The address decoder 124 may receive an address ADDR. The address decoder 124 may decode a row address on the basis of the received address ADDR, and may control a voltage of the plurality of word lines WL on the basis of the decoded row address. The address decoder 124 may decode a column address (not shown) on the basis of the received address, and may transmit the decoded column address to the input/output circuit 126.

The control logic & voltage generator 125 may receive a command CMD and a control signal CTRL, and may control the address decoder 124 and the input/output circuit 126 in response to the received signals. The control logic & voltage generator 125 may generate various voltages that are required when the nonvolatile memory device 120 operates. For example, the control logic & voltage generator 125 may generate the various voltages such as a plurality of read voltages, a plurality of program voltages, a plurality of pass voltages and a plurality of erase voltages.

The input/output (I/O) circuit 126 may be connected to the memory cell array 123 through a plurality of bit lines BL. The I/O circuit 126 may write data received from the memory controller 110 in the memory cell array 121. At this time, the I/O circuit 126 may operate as a write driver. The I/O circuit 126 may read data stored in the memory cell array 121, and may transmit the read data to the memory controller 110. At this time, the I/O circuit 126 can operate as a sense amplifier.

The I/O circuit 126 may read data of a first area (for example, an area indicating at least one memory block among a plurality of memory blocks included in the user area 121) of the memory cell array 123 in order to write the read data in the second area (for example, a memory block different from the memory block of the first area among the memory blocks included in the user area 121) of the memory cell array 123. That is, the I/O circuit 126 can perform a copy-back operation.

The input/output circuit 126 may include constituent elements such as a sense amplifier, a write driver, a page buffer (or page register), a column select circuit, a data buffer, and so on.

In exemplary embodiments, when a garbage collection operation is performed under the control of the memory controller 110, the I/O circuit 126 can perform a copy-back operation.

Figure 4:
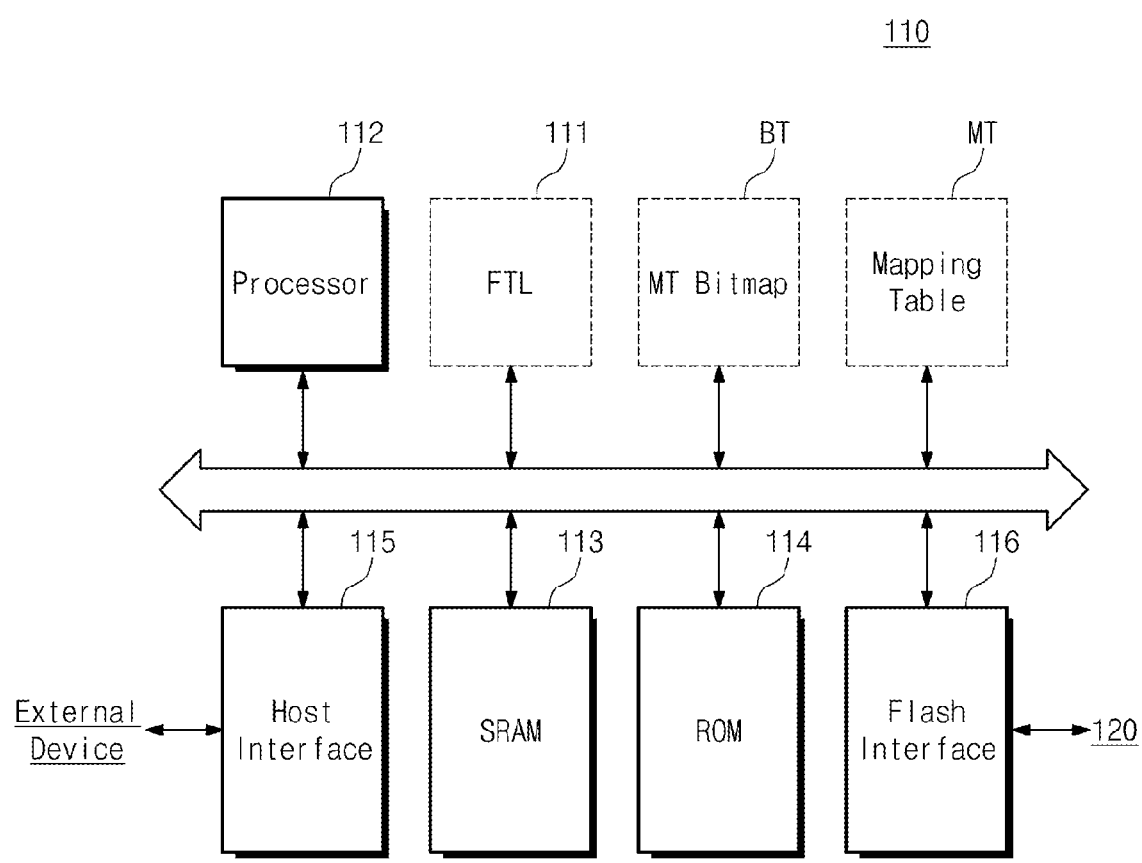
FIG. 4 is a block diagram illustrating a memory controller illustrated in FIG. 1 in detail.

FIG. 4 is a block diagram illustrating a memory controller illustrated in FIG. 1 in detail. Referring to FIGS. 1 and 4, the memory controller 110 may include the FTL 111, a processor 112, the mapping table MT, the bitmap BT, an SRAM 113, a ROM 114, a host interface 115 and a flash interface 116. Since the FTL 111, the mapping table MT and the bitmap BT were described in detail with reference to FIGS. 1 through 3, a detailed description thereof will be here omitted.

The processor 112 may control an overall operation of the memory controller 110. The SRAM 113 may operate as a buffer memory, a cache memory, or a working memory. The ROM 114 may store a variety of information, being required when the memory controller 110 operates in the form of firmware.

The memory controller 110 may communicate with an external device through the host interface 115. The host interface 115 may include various interfaces such as a universal serial bus (USB), a multimedia card (MMC), a peripheral component interconnection (PCI), a PCI-express, an advanced technology attachment (ATA), a serial-ATA, a parallel-ATA, a small computer small interface (SCSI), an enhanced small disk interface (ESDI), an integrated drive electronics (IDE), a mobile industry processor interface (MIPI), a nonvolatile memory-express (NVMe), a universal flash storage (UFS), and so on. The memory controller 110 may communicate with the nonvolatile memory device 120 through the flash interface 116.

In exemplary embodiments, the memory controller 110 may read a mapping table MT and a bitmap BT stored in the meta area 122 of the nonvolatile memory device 120. The mapping table MT and the bitmap BT read from the nonvolatile memory device 120 may be stored in the SRAM 113, and may be managed by the processor 112. The FTL 111 may be provided in a software form and may be driven by the processor 112.

In exemplary embodiments, the mapping table MT, the bitmap BT and the FTL 111 may be stored in the SRAM 113. The mapping table MT, the bitmap BT and the FTL 111 stored in the SRAM 113 may be operated by the processor 112.

Figure 5:
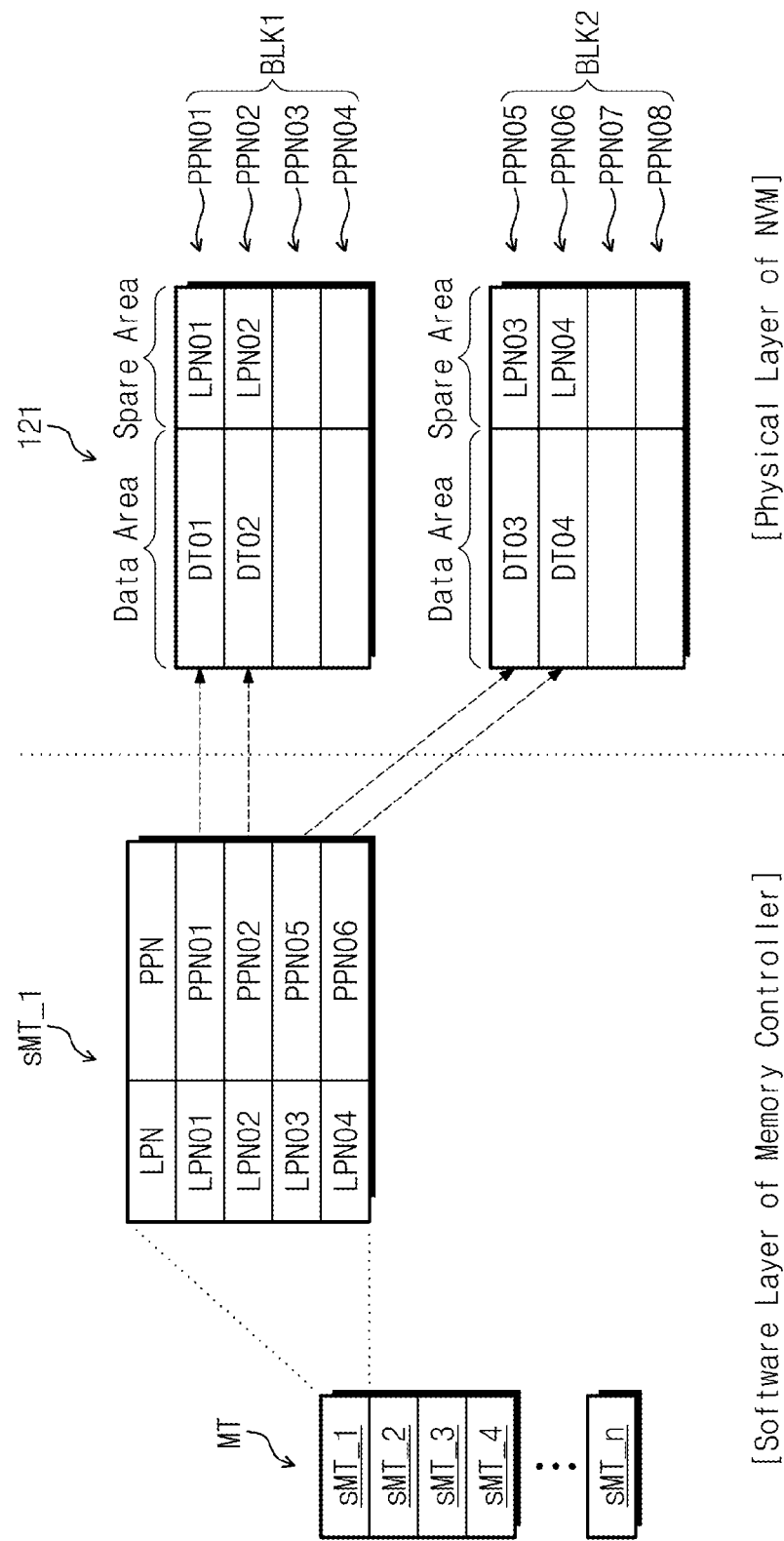
FIGS. 5 and 6 are drawings explaining an address mapping operation of the memory controller illustrated in FIG. 4.
Figure 6:
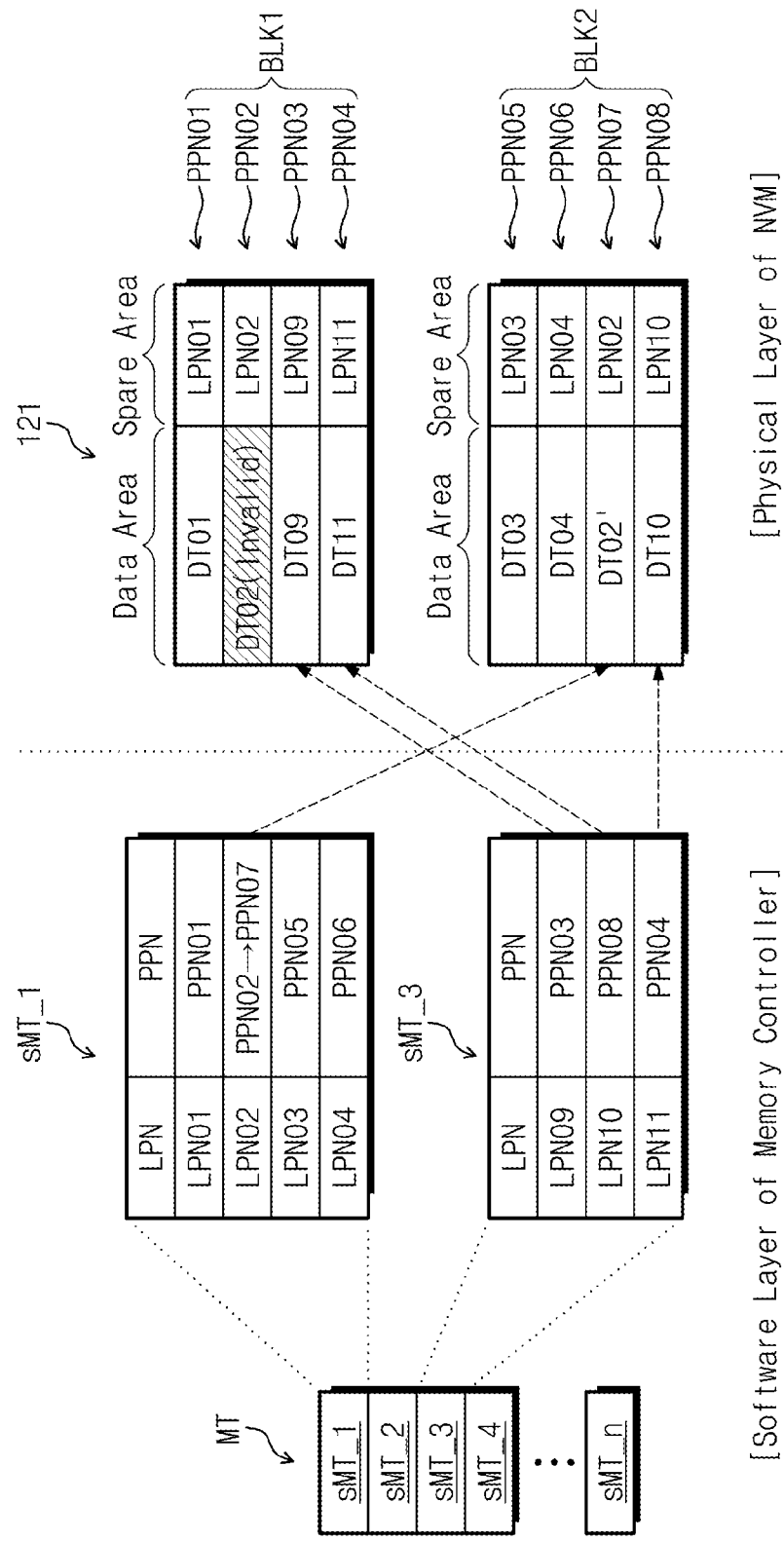

FIGS. 5 and 6 are drawings explaining an address mapping operation of the memory controller illustrated in FIG. 4. For brevity of description, it will be assumed that the memory controller 110 operates based on a full-page mapping scheme. However, the inventive concept is not limited thereto, and the memory controller 110 can operate based on various mapping scheme such as a block mapping scheme, a hybrid mapping scheme, and so on.

In exemplary embodiments, a logical page number LPN may indicate a logical location of data generated on the basis of a logical address ADDR_log received from an external device. A physical page number may indicate a physical location of a plurality of pages included in the nonvolatile memory device 120.

It will be assumed that the user area 121 includes first and second memory blocks BLK1 and BLK2, the first memory block BLK1 includes first through fourth physical pages PPN01 to PPN04, and the second memory block BLK2 includes fifth through eighth physical pages PPN05 to PPN08. Each of the first through eighth physical pages PPN01 to PPN08 may include a data area for storing the user data DT and a spare area for storing the logical page number LPN. However, the inventive concept is not limited thereto.

Referring to FIGS. 1, 4 and 5, the memory controller 110 may read a mapping table MT stored in the meta area 122 in order to store the read mapping table MT in the SRAM 113. The mapping table MT may include a plurality of sub-mapping tables sMT_1 to sMT_n.

Each of the plurality of sub-mapping tables sMT_1~sMT_n may include mapping information of a predetermined number of logical page numbers. For example, a first sub-mapping table sMT_1 may include mapping information of first to fourth logical page numbers LPN01 to LPN04. The first sub-mapping table sMT_1 may include mapping information between the first logical page number LPN01 and a first physical page PPN01, mapping information between the second logical page number LPN02 and a second physical page PPN02, mapping information between the third logical page number LPN03 and a fifth physical page PPN05, and mapping information between the fourth logical page number LPN04 and a sixth physical page PPN06.

According to information stored in the first sub-mapping table sMT_1, first user data DT01 may be stored in a data area of the first physical page PPN01, and the first logical page number LPN01 may be stored in a spare area of the first physical page PPN01. Similarly, second user data DT02 may be stored in a data area of the second physical page PPN02, and the second logical page number LPN02 may be stored in a spare area of the second physical page PPN02. Third user data DT03 may be stored in a data area of the fifth physical page PPN05, and the third logical page number LPN03 may be stored in a spare area of the fifth physical page PPN05. Fourth user data DT04 may be stored in a data area of the sixth physical page PPN06, and the fourth logical page number LPN04 may be stored in a spare area of the sixth physical page PPN06. Each of the first to fourth user data DT01 to DT04 may correspond to each of the first through fourth logical page numbers LPN01 to LPN04, respectively.

Referring to FIGS. 1, 4 and 6, the second user data DT02 can be updated while the nonvolatile memory system 100 is driven. At this time, the memory controller 110 may update mapping information of the second logical page number LPN02 stored in the first sub-mapping table sMT_1, and may write updated second user data DT02' on the basis of the updated mapping information. For example, in case that the second user data DT02 corresponding to the second logical page number LPN02 is updated, the memory controller 110 can update the first sub-mapping table sMT_1 so that the second logical page number LPN02 can map to a seventh physical page PPN07. The memory controller 110 may control the nonvolatile memory device 120 so that the updated second user data DT02' can be written in the seventh physical page PPN07. The second user data DT02 stored in the second physical page PPN03 may become invalid data.

Ninth to eleventh user data DT09 to DT11 may be further written while the nonvolatile memory system 100 is driven. At this time, the memory controller 110 may control the nonvolatile memory device 120 so that the ninth to eleventh user data DT09 to DT11 can be written in the third, eighth and fourth physical pages PPN03, PPN08 and PPN04, respectively. Mapping information of ninth to eleventh logical page numbers LPN09 to LPN11 indicating logical locations of the ninth to eleventh user data DT09 to DT11 may be included in the third sub-mapping table sMT_3. The memory controller 110 may update the third sub-mapping table sMT_3 so that the ninth to eleventh logical page numbers LPN09 to LPN11 can map to the third, eighth and fourth physical pages PPN03, PPN08 and PPN04, respectively.

In exemplary embodiments, the updated sub-mapping table may be periodically or non-periodically flushed to the meta area 122 of the nonvolatile memory device 120. The operation of the memory controller 110 described above may be performed by the FTL 111 provided as a software layer. The operation of the memory controller 110 described above may be performed by the processor 112 driving the FTL 111.

Figure 7:
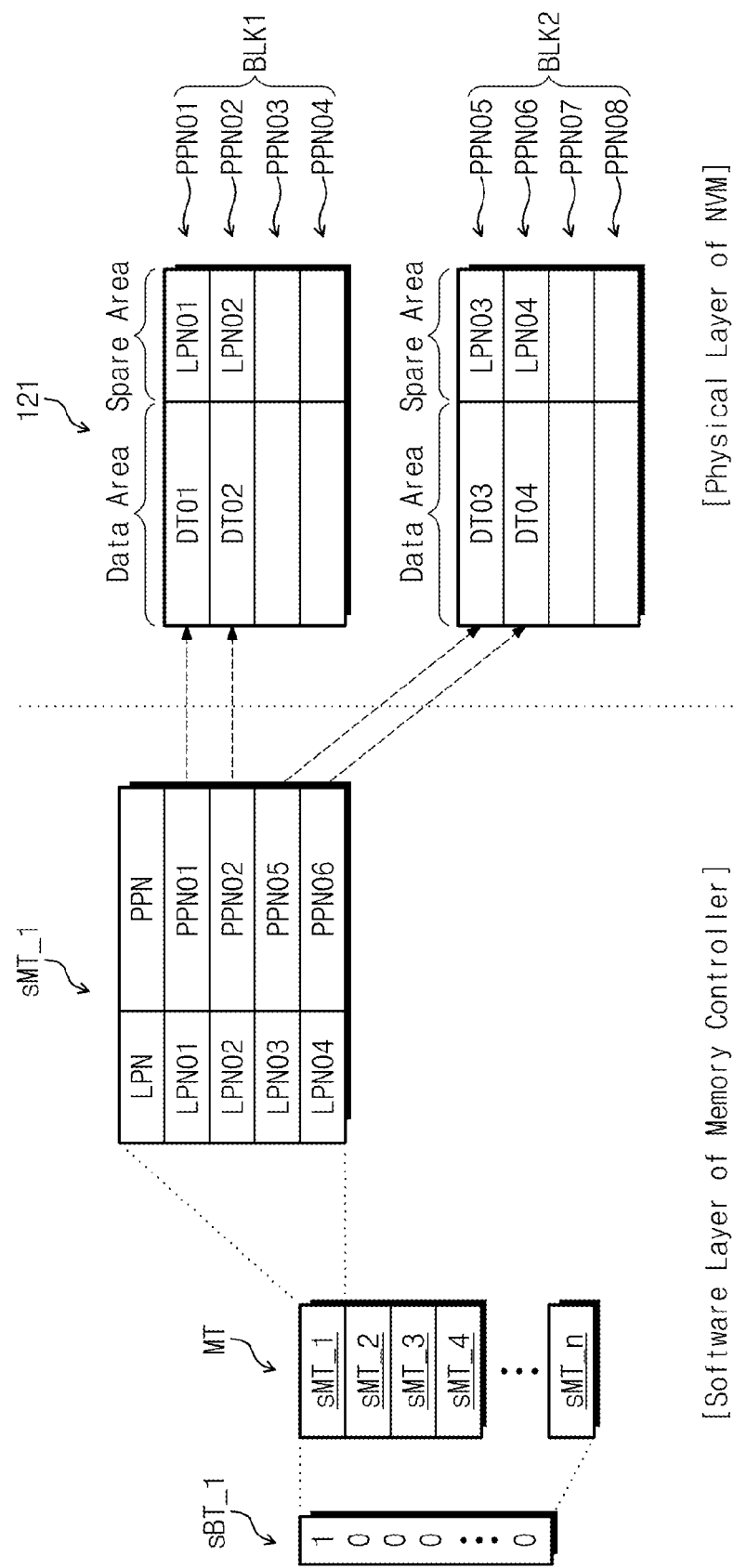
FIGS. 7 and 8 are drawings explaining a bitmap illustrated in FIG. 1.
Figure 8:
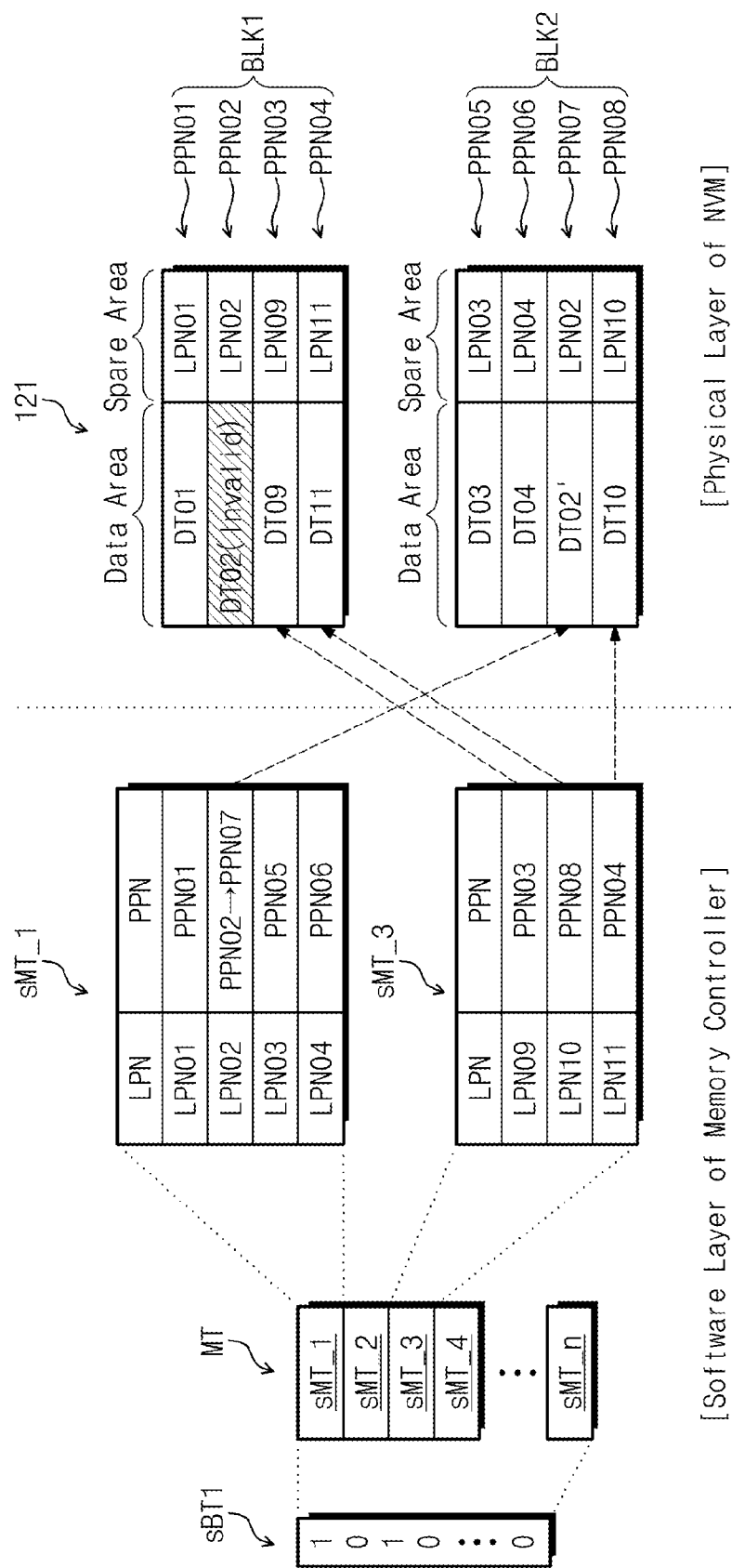

FIGS. 7 and 8 are drawings explaining a bitmap illustrated in FIG. 1. A first bitmap sBT_1 including information (i.e., location information of a valid mapping table with respect to user data DT stored in the first memory block BLK1) related to the first memory block BLK1 is illustrated in FIG. 7. However, the inventive concept is not limited thereto, and a bitmap BT may include a plurality of sub-bitmaps with respect to a plurality of memory blocks, respectively. Each of the plurality of sub-bitmaps can be managed by memory block, sub-block, super-block, word line or page units.

Since the first and second memory blocks BLK1 and BLK2, the first to eighth physical pages PPN01 to PPN08, the first to fourth user data DT01 to DT04, the ninth to eleventh user data DT09 to DT11, the first to nth sub-mapping tables sMT_1 to sMT_n, the first to fourth logical page numbers LPN01 to LPN04 and the ninth to eleventh logical page numbers LPN09 to LPN11 were described with reference to FIGS. 5 and 6, a detailed description thereof will be here omitted.

Referring to FIGS. 1, 4, 5 and 7, the memory controller 110 may read the first sub-bitmap sBT_1 from the meta area 122 of the nonvolatile memory device 120. The first sub-bitmap sBT_1 may include location information of a valid mapping table effective for user data stored in the first memory block BLK1.

For example, the mapping table MT may include the first to nth sub-mapping tables sMT_1 to sMT_n. The first sub-bitmap sBT_1 may include n-bit data. The n-bits may be managed to correspond to the first to nth sub-mapping tables sMT_1 to sMT_n, respectively. As illustrated in FIG. 5, in case that the first and second user data DT01 and DT02 are stored in the first memory block BLK1, the first sub-mapping table sMT_1 storing mapping information of the first and second logical page numbers LPN01 and LPN02 may be a valid mapping table with respect to the first memory block BLK1. At this time, the first sub-mapping table sMT_1 may be the valid sub-mapping table with respect to the first memory block BLK1. The memory controller 110 may set a bit corresponding to the first sub-mapping table sMT_1 among the n-bits included in the first sub-bitmap sBT_1 as "data 1 (or logic high)".

Referring to FIG. 8, as described with reference to FIG. 7, the second user data DT02 may be updated, and the ninth to eleventh user data DT09 to DT11 may be written. At this time, valid data stored in the first memory block BLK1 may be first, ninth and eleventh user data DT01, DT09 and DT11. The first logical page number LPN01 indicating a logical location of the first user data DT01 may be included in the first sub-mapping table sMT_1, and the ninth and eleventh logical page numbers LPN09 and LPN11 indicating a logical location of the ninth and eleventh user data DT09 and DT11 may be included in the third sub-mapping table sMT_3. At this time, the first and third sub-mapping tables sMT_1 and sMT_3 may be valid sub-mapping tables with respect to the first memory block BLK1. The memory controller 110 may set bits corresponding to the first and third sub-mapping tables sMT_1 and sMT_3 among the n-bits included in the first sub-bitmap sBT_1 as "data 1".

Alternatively, bits corresponding to the valid sub-mapping table among bits of the sub-bitmap may be set to "data 0", and the remaining bits may be set to "data 1".

Figure 9:
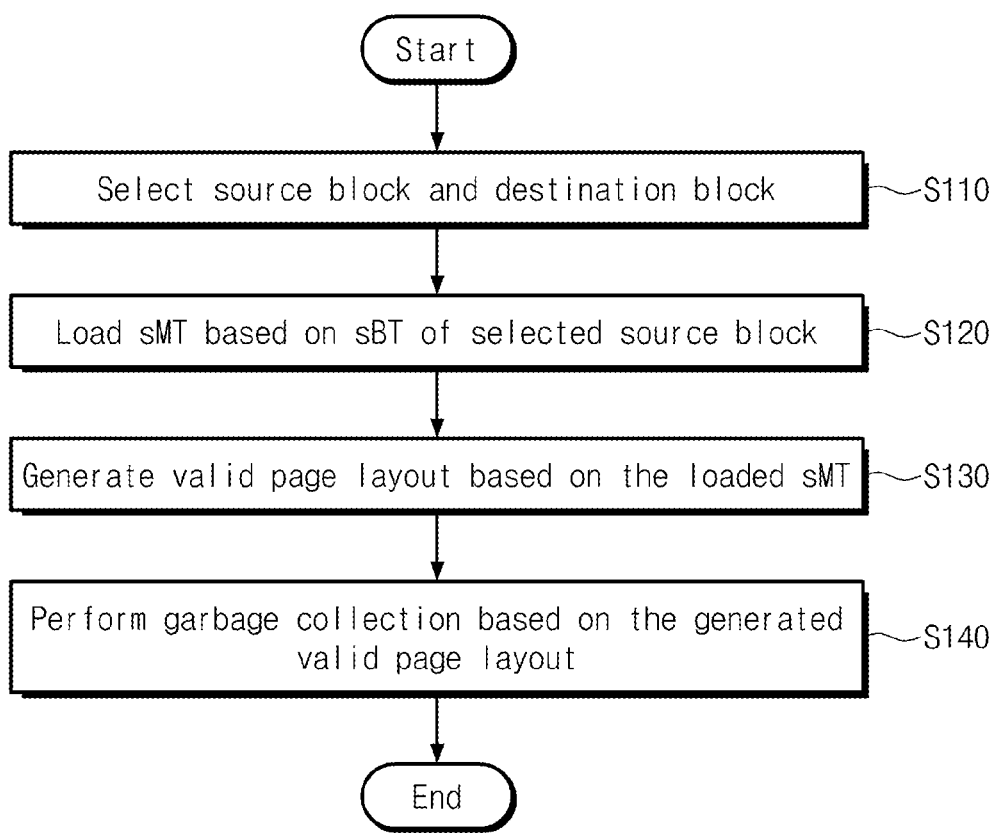
FIG. 9 is a flow chart illustrating an operation of a memory controller illustrated in FIG. 1.

FIG. 9 is a flow chart illustrating an operation of a memory controller illustrated in FIG. 1. A garbage collection operation of the memory controller 110 is described with reference to FIG. 9. Referring to FIGS. 1 and 9, in a step S110, the memory controller 110 can select a source block and a destination block. For example, the memory controller 110 can select the source block among memory blocks included in the user area 121. The memory controller 110 can select the source block based on an access frequency to a memory block, the number of a read operation, and so on. However, the inventive concept is not limited thereto and the source block may be selected on the basis of various schemes.

The memory controller 110 may select a destination block among a plurality of free blocks included in the user area 121. The free block may indicate a memory block in an erase state. The memory controller 110 may select a free block having the least number of P/E cycles among the free blocks as a destination block by a wear-leveling operation.

In a step S120, the memory controller 110 may load a sub-mapping table on the basis of a sub-bitmap of the selected source block. For example, as described with reference to FIGS. 8 and 9, a bitmap BT stored in the meta area 122 may include a plurality of sub-bitmaps sBT corresponding to memory blocks respectively. The plurality of sub-bitmaps sBT may include location information (or, valid information) of the sub-mapping tables. The memory controller 110 may read or load a sub-bitmap corresponding to a selected source block among the plurality of sub-bitmaps sBT in order to select a valid sub-mapping table on the basis of the read sub-bitmap.

In a step S130, the memory controller 110 may generate a valid page layout on the basis of a loaded sub-mapping table sMT. The valid page layout may indicate a layout constituted by valid pages among a plurality of pages included in the selected source block.

In a step S140, the memory controller 120 may perform a garbage collection operation on the basis of the generated valid page layout.

As described above, the memory controller 110 may load the valid sub-mapping table sBT on the basis of a bitmap BT stored in the meta area. The memory controller 110 may generate a valid page layout on the basis of the loaded sub-mapping table sBT, and may perform a garbage collection operation on the basis of the generated valid page layout. That is, when the memory controller 110 generates a valid page layout, since there is no need to scan a spare area, (that is, there is no need to scan the logical page numbers LPN of the user data stored in the source block), a nonvolatile memory system having improved performance is provided.

Figure 10:
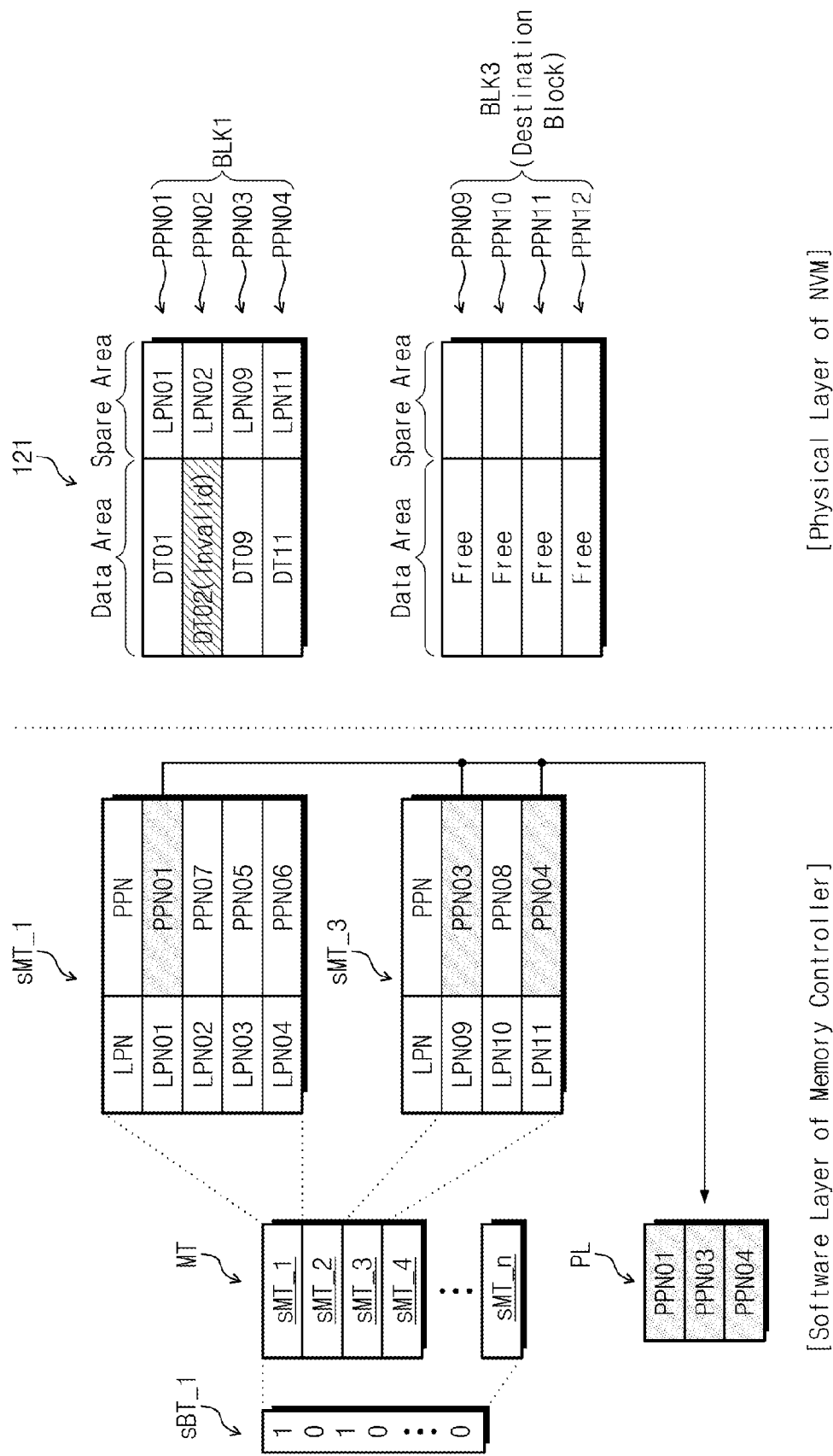
FIG. 10 is a drawing explaining step S120 and step S130 of FIG. 9.

FIG. 10 is a drawing explaining step S120 and step S130 of FIG. 9. For brevity of description, a detailed description of the first sub-bitmap sBT_1, the mapping table MT and the sub-mapping tables sMT_1 to sMT_n described with reference to FIGS. 6 through 8 will be here omitted. It will be assumed that the first and third memory blocks BLK1 and BLK3 include the first to fourth pages physical PPN01 to PPN04 and the ninth to twelfth physical pages PPN09 to PPN12, respectively. However, the inventive concept is not limited thereto.

Referring to FIGS. 1, 9 and 10, the first memory block BLK1 may be selected as a source block under the control of the memory controller 110. The third memory block BLK3 may be a free block, and may be selected as a destination block under the control of the memory controller 110.

As described with reference to FIG. 8, the first memory block BLK1 may store the first, ninth and eleventh user data DT01, DT09 and DT11. The first sub-bitmap SBT_1 corresponding to the first memory block BLK1 may store bits corresponding to the first and third sub-mapping tables sMT_1 and sMT_3 as a valid bit (i.e., logic high).

The memory controller 110 may load the first and third sub-mapping tables sMT_1 and sMT_3 on the basis of the first sub-bitmap SBT_1. The memory controller 110 may load the first and third sub-mapping tables sMT_1 and sMT_3 stored in the meta area 122 on the basis of the first sub-bitmap sBT 1. The loaded first and third sub-mapping tables sMT_1 and sMT_3 may be stored in the SRAM 113 (refer to FIG. 4).

The memory controller 110 may search whether physical page numbers of pages (i.e., first to fourth physical pages PPN01 to PPN04) of the first memory block BLK1 are included in the loaded first and third sub-mapping tables sMT_1 and sMT_3. The memory controller 110 can generate a valid page layout PL on the basis of a search result.

For example, since the first user data DT01 is stored in the first physical page PPN01, the first sub-mapping table sMT_1 may include a physical page number of the first physical page PPN01. Since the ninth and eleventh user data DT09 and DT11 are stored in the third and fourth physical pages PPN03 and PPN04, respectively, the third sub-mapping table SMT_3 may include physical page numbers of the third and fourth physical pages PPN03 and PPN04. The memory controller 110 may search physical page numbers of the first, third and fourth pages PPN01, PPN03 and PPN04 from the first and third mapping tables sMT_1 and sMT_3. The memory controller 110 can generate a valid page layout PL including the physical page numbers of the first, third and fourth pages PPN01, PPN03 and PPN04.

In exemplary embodiments, a nonvolatile memory system or a memory card included in a mobile system, or a memory controller of a conventional nonvolatile memory system having a small resource cannot load the whole sub-mapping tables to use them because of having small resources. For example, since the resources of the memory controller are limited, the number of sub-mapping tables that can be stored in the memory controller is limited. Thus, the memory controller can obtain resources by periodically flushing sub-mapping tables used or updated to the nonvolatile memory device.

To constitute a valid page layout, the conventional memory controller scans a logical page number stored in a spare area of a source block, and loads sub-mapping tables on the basis of a scanned result. However, since the memory controller in accordance with the inventive concept loads valid sub-mapping tables on the basis of a sub-bitmap without scanning a spare area of a source block, overhead consumed to scan the source block may be reduced. Thus, a nonvolatile memory system having improved reliability is provided.

Figure 11:
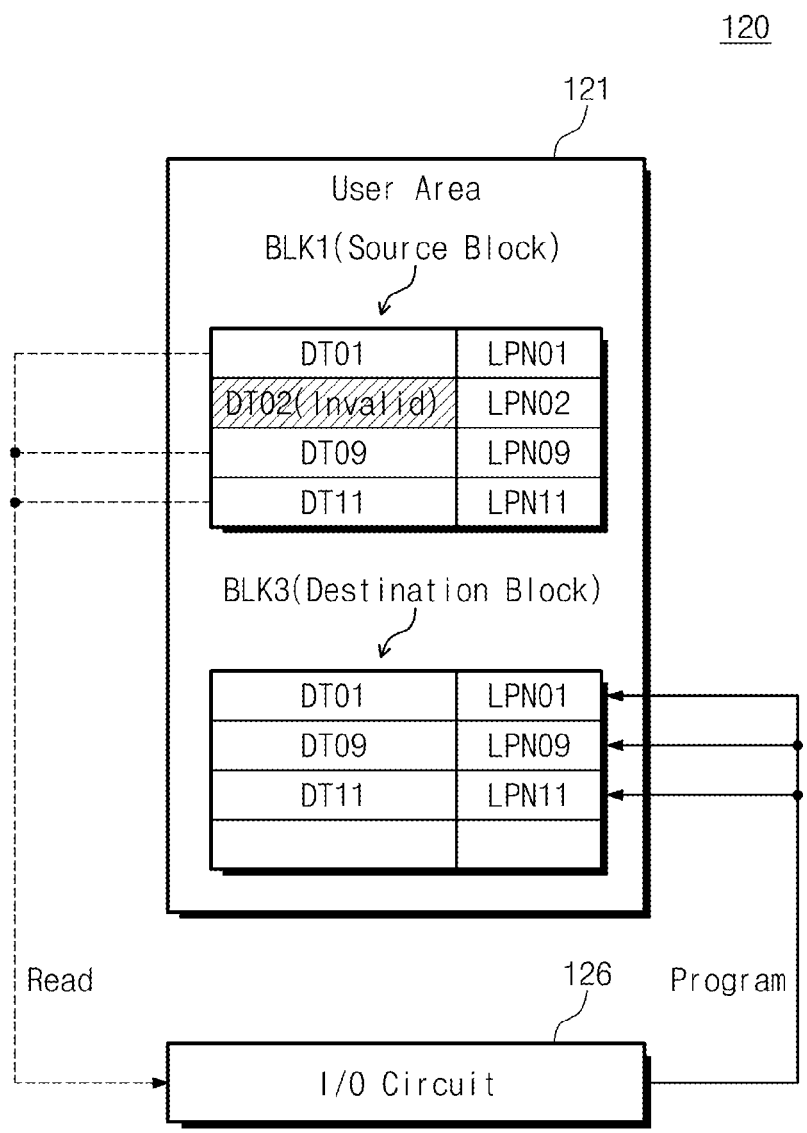
FIGS. 11 and 12 are drawings explaining step S140 of FIG. 9.
Figure 12:
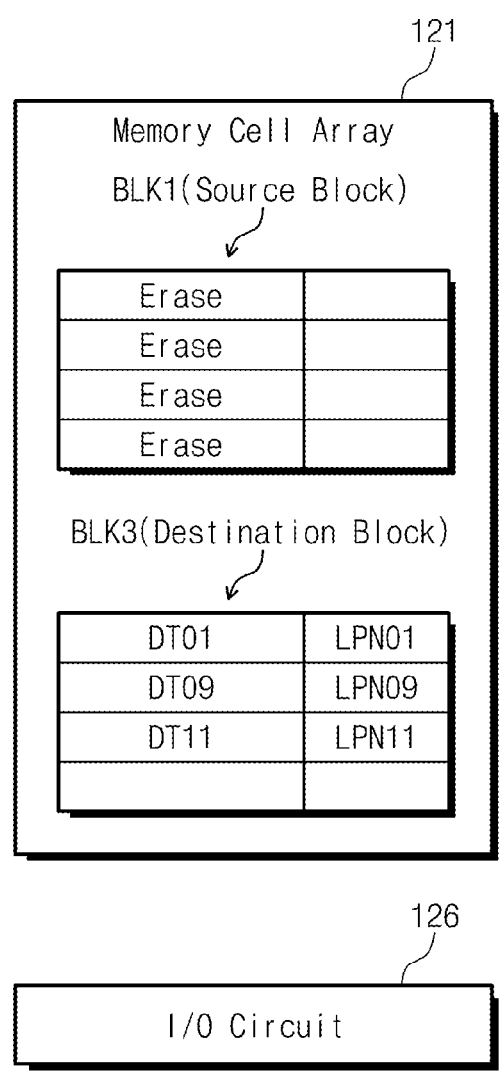

FIGS. 11 and 12 are drawings explaining step S140 of FIG. 9. For brevity of description, unnecessary constituent elements that describe an operation of a garbage collection GC will be here omitted. Referring to FIGS. 1, 10, 11 and 12, the nonvolatile memory device 120 may include the user area 121 and the I/O circuit 126. The user area 121 may include the first and third memory blocks BLK1 and BLK3. The first memory block BLK1 may be a source block, and the third memory block BLK3 may be a destination block.

The memory controller 110 may perform a garbage collection operation on the basis of a generated valid page layout PL. For example, the memory controller 110 may control the nonvolatile memory device 120 so that user data DT01, DT09 and DT11 stored in the first, third and fourth physical pages PPN01, PPN03 and PPN04 can be stored in the third memory block BLK3.

The nonvolatile memory device 120 may perform a copy-back operation under a control of the memory controller 110. For example, the I/O circuit 126 can read the user data DT01 stored in the first page PPN01 in order to program the read user data DT01 in a ninth physical page PPN09 of the third memory block BLK3. The I/O circuit 126 can read the user data DT09 stored in the third physical page PPN03 in order to program the read user data DT09 in a tenth physical page PPN10 of the third memory block BLK3. The I/O circuit 126 can read the user data DT11 stored in the fourth physical page PPN04 in order to program the read user data DT11 in an eleventh physical page PPN11 of the third memory block BLK3. That is, the nonvolatile memory device 120 can perform read and program operations with respect to the third physical page PPN03 after completing read and program operations with respect to the first physical page PPN01. The nonvolatile memory device 120 can perform read and program operations with respect to the fourth physical page PPN04 after completing read and program operations with respect to the third physical page PPN03.

In exemplary embodiments, the nonvolatile memory device 120 may read the user data DT01, DT09 and DT11 stored in the first, third and fourth physical pages PPN01, PPN03 and PPN04, and then may program the user data DT01, DT09 and DT11 in the third memory physical block BLK3.

As described in FIG. 12, after the copy-back operation of the nonvolatile memory device 120 is completed, the first memory block BLK1, that is, the source block can be erased. The erased first memory block BLK1 can be managed as a free block.

In exemplary embodiments, the I/O circuit 126 may include an error correction code (ECC) engine (not shown). The I/O circuit 126 may detect and correct errors of data that is read from the first memory block BLK1 in order to program the corrected data in the third memory block BLK3. Alternatively, the memory controller 110 may include the ECC engine (not shown). The memory controller 110 may receive data that is read from the first memory block BLK1, and may detect and correct errors of the received data. The memory controller 110 may control the nonvolatile memory device 120 such that the corrected data can be written in the third memory block BLK3.

Figure 13:
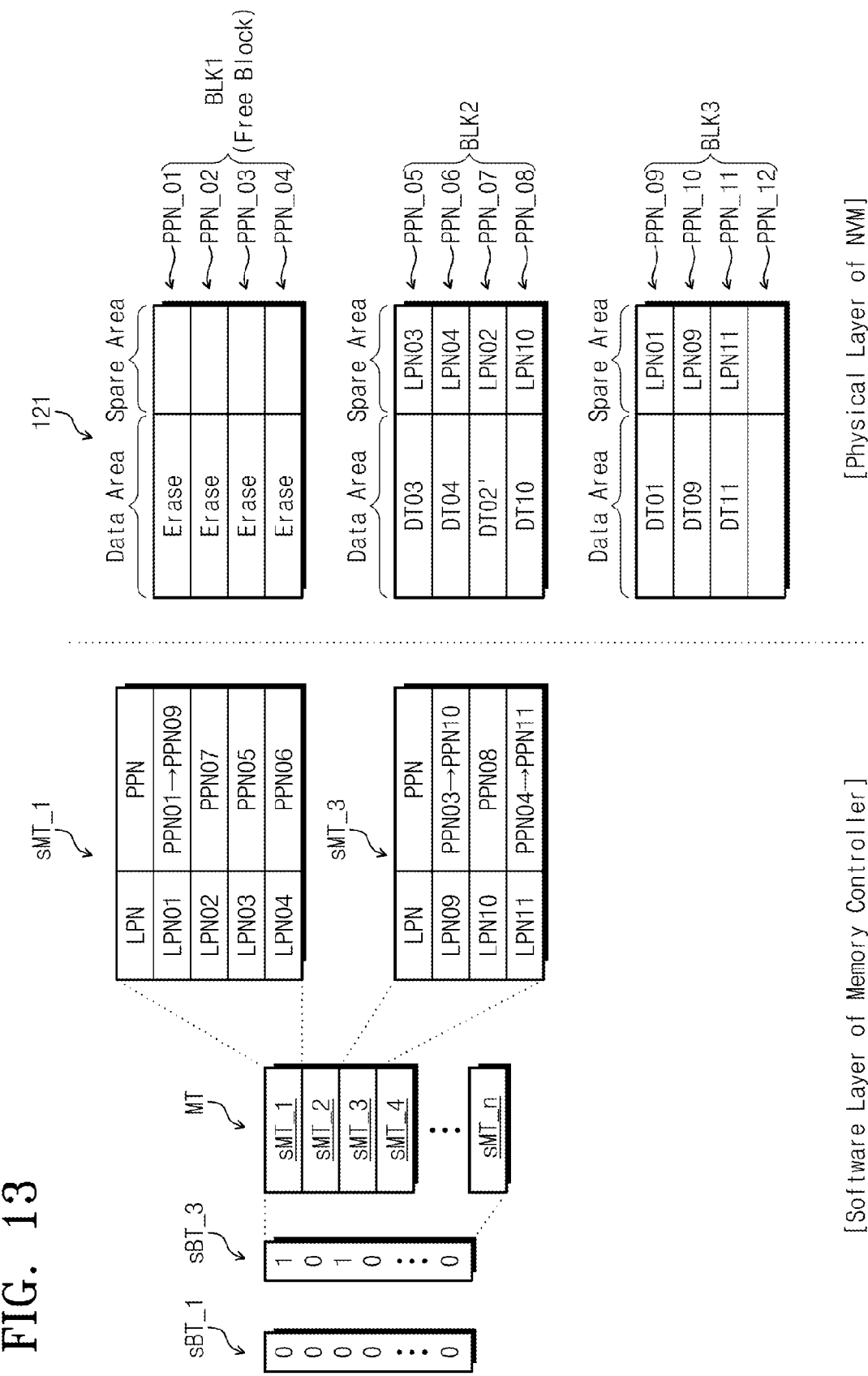
FIG. 13 is a drawing explaining an operation of a memory controller after a garbage collection operation of a nonvolatile memory system.

FIG. 13 is a drawing explaining an operation of a memory controller after a garbage collection operation of a nonvolatile memory system. For brevity of description, a detailed description of the first sub-bitmap sBT_1, the mapping table MT, the sub-mapping tables sMT_1 to sMT_n, the first to third memory blocks BLK1 to BLK3 and the first to twelfth physical pages PPN01 to PPN12 described with reference to FIGS. 5 through 12 is here omitted.

Referring to FIGS. 1 and 13, the nonvolatile memory system 100 can perform a garbage collection operation on the basis of the operation method described with reference to FIGS. 9 to 12. After the garbage collection operation of the nonvolatile memory system 100, the first memory block BLK1 may be a free block. The third memory block BLK3 may store the user data DT01, DT09 and DT11.

The memory controller 110 may update a physical page number corresponding to first, ninth and eleventh logical page numbers LPN01, LPN09 and LPN11 indicating a logical location of the user data DT01, DT09 and DT11. For example, mapping information of the first logical page number LPN01 may be included in the first sub-mapping table sMT_1. The memory controller 110 may update the first sub-mapping table sMT_1 so that the first logical page number LPN01 can be mapped to a physical page number of the ninth physical page PPN09. Mapping information of the ninth and eleventh logical page number LPN09 and LPN11 may be included in the third sub-mapping table sMT_3. The memory controller 110 may update the third sub-mapping table sMT_3 so that the ninth and eleventh logical page number LPN09 and LPN11 can be mapped to physical page numbers of the tenth and eleventh physical pages PPN10 and PPN11, respectively.

The memory controller 110 may update a bitmap BT on the basis of an updated mapping table MT. For example, since the first memory block BLK1 is a free block, a valid sub-mapping table corresponding to the first memory block BLK1 may not exist. Thus, the memory controller 110 may set a plurality of bits included in the first sub-mapping table sMT_1 as 'data 0'. The user data DT01, DT09 and DT11 stored in the third memory block BLK3 may be valid data. That is, the first and third sub-mapping tables sMT_1 and sMT_3 may be valid sub-mapping tables with respect to the third memory block BLK3. The memory controller 110 may set bits corresponding to the first and third sub-mapping tables sMT_1 and sMT_3 among a plurality of bits of the third sub-bitmap sBT_3 as 'data 1'. An updated bitmap BT may be flushed to the meta area 122.

According to some embodiments of the inventive concept, the memory controller 110 may manage location information (or, valid information) of a valid sub-mapping table sMT with respect to each memory block as a bitmap BT. The bitmap BT may be stored in the meta area 122 of the nonvolatile memory device 120. Thus, when a garbage collection operation of the nonvolatile memory device 120 is performed, a valid page layout can be generated on the basis of the bitmap BT without scanning a spare area of the source block, and thereby overhead caused by a scan operation of a spare area, an error correction operation, and so on may be reduced. Thus, a nonvolatile memory system having improved performance is provided.

Figure 14:
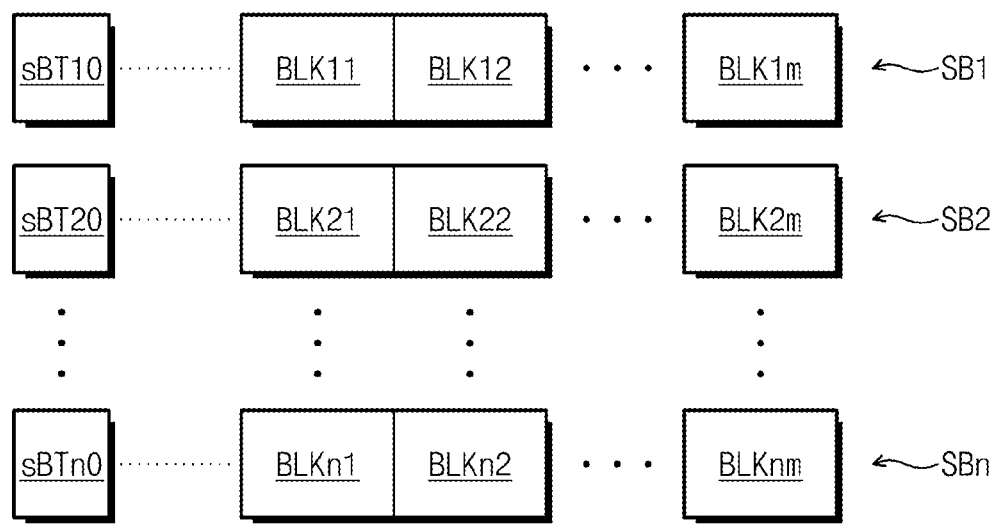
FIG. 14 is a drawing explaining an operation of a nonvolatile memory system in accordance with other embodiments of the inventive concept.

FIG. 14 is a drawing explaining an operation of a nonvolatile memory system in accordance with other embodiments of the inventive concept. Referring to FIGS. 1 and 14, the user area 121 may include a plurality of memory blocks BLK11 to BLKnm. The memory blocks BLK11 to BLKnm can be managed by a predetermined unit. For example, the memory blocks BLK11 to BLKnm can be managed by a super-block. The memory controller 110 can manage sub-bitmaps sBT_10 to sBTn0 with respect to a plurality of super-blocks SB1~SBn respectively.

As described above, since the memory controller 110 manages the memory blocks BLK11 to BLKnm by a super-block unit and manages sub-bitmaps SBT10 to SBTn0 with respect to the super-blocks SB1 to SBn, overhead caused by a scan operation of the spare area when a garbage collection operation is performed may be reduced. Thus, a nonvolatile memory device having improved performance is provided.

Figure 15:
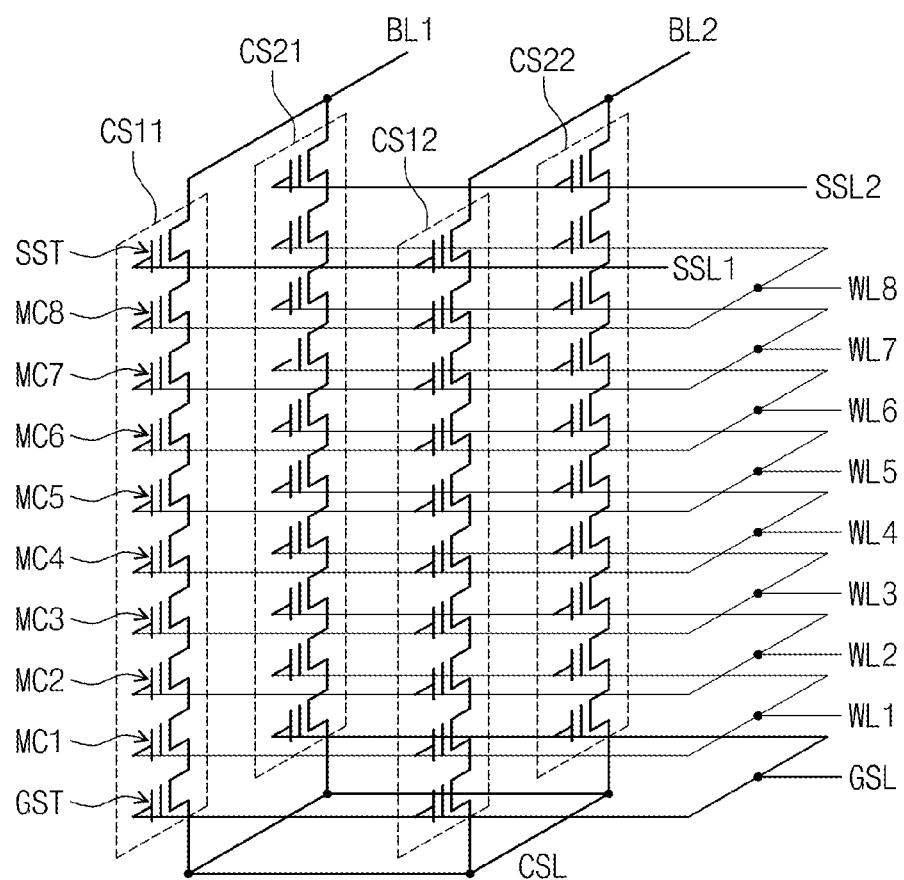
FIG. 15 is a circuit illustrating any one memory block among a plurality of memory blocks included in a memory cell array of FIG. 3.

FIG. 15 is a circuit illustrating any one memory block among a plurality of memory blocks included in a memory cell array of FIG. 3. A first memory block BLK1 is illustrated in FIG. 15 but the inventive concept is not limited thereto. The memory blocks included in the nonvolatile memory device 120 may have the same structure as the first memory block illustrated in FIG. 15.

Referring to FIG. 15, the first memory block BLK1 may include a plurality of cell strings CS11 to CS12 and CS21 to CS22. The plurality of cell strings CS11 to CS12 and CS21 to CS22 may be connected between bit lines BL1 and BL2 and a common source line CSL. Each of the plurality of cell strings CS11 to CS12 and CS21 to CS22 may include a string select transistor SST, a plurality of memory cells MC1 to MC8 and a ground select transistor GST.

The string select transistors SST may be connected to string select lines SSL1 and SSL2, respectively. The memory cells MC1 to MC8 may be connected to a plurality of word lines WL1~WL8, respectively. The ground select transistors GST may be connected to a ground select line GSL. The string select transistors SST may be connected to the bit lines BL1 and BL2, and the ground select transistors GST may be connected to the common source line CSL. Word lines (e.g., WL1) of the same height may be connected in common. In case of programming memory cells that are connected to the first word line WL1 and included in the cell strings CS11 and CS12, the first word line WL1 and the first string select line SSL1 may be selected.

The first memory block BLK1 illustrated in FIG. 15 is illustrative, but, the inventive concept is not limited to the first memory block BLK1 illustrated in FIG. 15. For example, the number of rows of the cell strings may increase or decrease. As the number of rows of the cell strings is changed, the number of string select lines or ground select lines being connected to rows of the cell strings and the number of cell strings being connected to one bit line may also be changed.

The number of columns of the cell strings may increase or decrease. As the number of columns of the cell strings is changed, the number of bit lines being connected to columns of the cell strings and the number of cell strings being connected to one string select line may also be changed.

A height of the cell strings may increase or decrease. For example, the number of memory cells stacked at each cell string may increase or decrease. As the number of memory cells stacked at each cell string is changed, the number of word lines may also be changed. The number of the string select transistors or the ground select transistors provided to each cell string may increase. As the number of the string select transistors or the ground select transistors provided to each cell string is changed, the number of the string select lines or the ground select lines may also be changed. If the number of the string select transistors or the ground select transistors is increased, the string select transistors or the ground select transistors may be stacked in the same form as the memory cells MC1 to MC8.

A write or read operation can be performed by a unit of a row of the cell strings CS11 to CS22. The cell strings CS11 to CS22 can be selected by one row unit by the string select lines SSL1 and SSL2.

In a selected row of the cell strings CS11 to CS22, a write or read operation may be performed by a page unit. The page may be one row of memory cells connected to one word line. In a selected row of the cell strings CS11 to CS22, the plurality of word lines WL1 to WL8 may select memory cells by the page unit.

The cell strings CS11 to CS22 may be formed in a direction perpendicular to a substrate (not shown). The string select transistor SST, the memory cells MC1~MC8 and the ground select transistor GST may be stacked in a direction perpendicular to a substrate (not shown).

The first memory block BLK1 may be a memory block having a three-dimensional structure. Memory cells included in the memory block having a three-dimensional structure may be charge trap flash (CTF) memory cells. The CTF memory cell can remember data by trapping charges in a charge storage layer. The CTF memory cell has a physical characteristic such that as time goes by after being programmed, a threshold voltage of the memory cells can be lowered. The physical characteristic of the CTF memory cell is called an initial verify shift IVS phenomenon.

Since in the operation method described with reference to FIGS. 1 through 14, a valid page layout PL can be generated without reading a spare area of the source block, overhead (i.e., overhead due to an error correction operation) that occurs by the IVS phenomenon described above may be reduced. Thus, a nonvolatile memory system having improved performance is provided.

Figure 16:
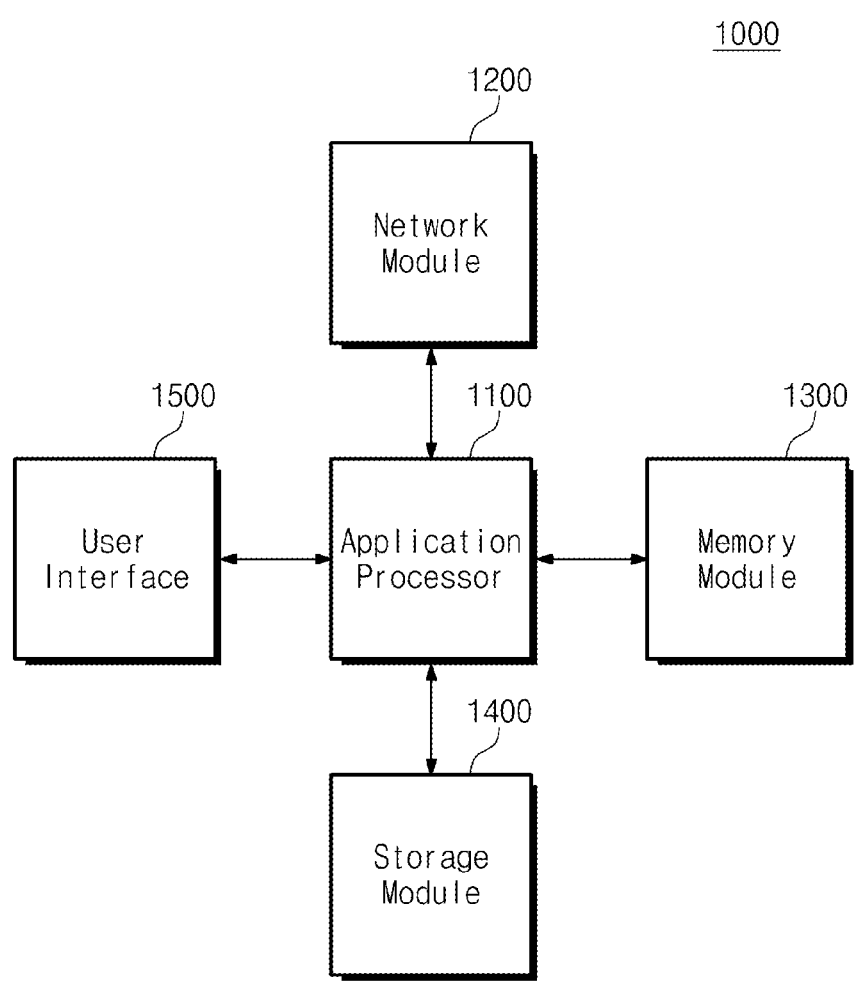
FIG. 16 is a block diagram illustrating a mobile system including a nonvolatile memory system in accordance with other embodiments of the inventive concept.

FIG. 16 is a block diagram illustrating a mobile system including a nonvolatile memory system in accordance with other embodiments of the inventive concept. Referring to FIG. 16, a mobile system 1000 may include an application processor 1100, a network module 1200, a memory module 1300, a storage module 1400 and a user interface 1500. Since the application processor 1100 was described with reference to FIG. 1, a detailed description thereof is here omitted.

The memory module 1300 can operate as a main memory, an operation memory, a buffer memory or a cache memory. The memory module 1300 may include a volatile random access memory such as DRAM, SDRAM, DDR SDRAM, DDR2 SDRAM, DDR3 SDRAM, LPDDR DRAM, LPDDR2 DRAM, LPDDR3 DRAM, and so on or a nonvolatile random access memory such as PRAM, ReRAM, MRAM, FRAM, and so on.

The network module 1200 can perform a communication with external devices. The network module 1200 can support a wireless communication such as a CDMA (code division multiple access), a GSM (global system for mobile communication), a WCDMA (wideband CDMA), a CDMA-2000, a TDMA (time division multiple access), a LTE (long term evolution), a Wimax, a WLAN, a UWB, a blue tooth, a WI-DI, and so on.

The storage module 1400 can store data. For example, the storage module 1400 can store data received from the outside. The storage module 1400 can transmit data stored in the storage module 1400 to the application processor 1100. The storage module 1400 can be embodied by a semiconductor memory device such as a PRAM, an MRAM, an RRAM, a NAND flash, a NOR flash, a three-dimensional NAND flash, and so on. The storage module 1400 may be provided by a solid state drive SSD, a multimedia card MMC, an embedded multimedia card eMMC, a general purpose flash storage UFS, and so on.

The storage module 1400 may be the nonvolatile memory system described with reference to FIGS. 1 through 14. The storage module 1400 can operate based on the operation method described with reference to FIGS. 1 through 15.

The storage module 1400 included in the mobile system 1000 may have limited resources and a limited storage capacity. Since the operation method of the nonvolatile memory system described with reference to FIGS. 1 through 15 loads a sub-mapping table based on location information (i.e., a bitmap BT) of a valid sub-mapping table, improved performance may be expected by applying the operation method of the nonvolatile memory system described with reference to FIGS. 1 through 15 to a system having limited resources and a limited storage capacity like the storage module 1400.

The user interface 1500 may include interfaces inputting data or a command to the mobile system 1000, or outputting data to an external device. The user interface 1500 may include input devices such as a camera, a touch screen, an operation recognition module, a mike, or output devices such as a display, a speaker, a touch screen, and so on.

According to embodiments of the inventive concept, a nonvolatile memory system may store a bitmap including location information of a valid sub-mapping table in a meta area. The bitmap may include a plurality of sub-bitmaps corresponding to a plurality of memory blocks. When a garbage operation is performed, the nonvolatile memory system may generate a valid page layout on the basis of the sub-bitmaps, and may perform a copy-back operation and an erase operation based on the generated valid page layout. That is, since when the garbage operation is performed, the valid page layout can be generated without scanning a spare area of a source block, and overhead (e.g., a read operation, an error correction operation, and so on) caused by scanning the spare area of the source block may be reduced. Thus, the nonvolatile memory system may have improved performance.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of controlling a nonvolatile memory device including a user area and a meta area, the user area including a plurality of memory blocks, the meta area being configured to store a mapping table and a bitmap, the mapping table including a plurality of sub-mapping tables, the bitmap including a plurality of sub-bitmaps, each of the plurality of sub-bitmaps corresponding to a respective memory block among the plurality of memory blocks, the method comprising:
    selecting a source block among the plurality of memory blocks;
    loading a part of the plurality of sub-mapping tables based on a sub-bitmap corresponding to the source block; and
    generating a valid page layout constituted by valid pages among pages included in the source block based on the loaded part of the plurality of sub-mapping tables, wherein the sub-bitmap corresponding to the source block comprises valid information of the plurality of sub-mapping tables with respect to the source block.

2. The method of claim 1, further comprising:
selecting a destination block from among the plurality of memory blocks in the user area; and
performing a garbage collection operation with respect to the source block and the destination block based on the valid page layout.

3. The method of claim 1, wherein the mapping table comprises mapping information between a logical address of data stored in a valid page and a physical address of the source block.

4. The method of claim 1, wherein the loading of the part of the plurality of sub-mapping tables comprises loading a part of the mapping table which is valid with respect to the source block.

5. The method of claim 1, wherein the generating of the valid page layout comprises comparing physical addresses included in the mapping table with physical addresses of the pages included in the source block.

6. The method of claim 5, wherein the generating of the valid page layout further comprises, when at least one physical address among the physical addresses of the pages included in the source block is included in the mapping table, generating the valid page layout such that the at least one physical address is included in the valid page layout.

7. The method of claim 1, further comprising, when data is written in at least one memory block among the plurality of memory blocks, when data included in the at least one memory block is invalid, or when the at least one memory block is erased, updating a sub-bitmap of the at least one memory block.

8. A nonvolatile memory system comprising:
a nonvolatile memory device including a user area and a meta area, the user area being configured to store user data, the user area including a plurality of memory blocks, the meta area being configured to store a mapping table and a bitmap, the mapping table including a plurality of sub-mapping tables, the bitmap including a plurality of sub-bitmaps, each of the plurality of sub-bitmaps corresponding to a respective memory block among the plurality of memory blocks; and
a memory controller configured to control the nonvolatile memory device, the memory controller being configured to select a source block among the plurality of memory blocks, to load a part of the plurality of the sub-mapping tables based on the selected source block, and to generate a valid page layout constituted by valid pages among pages included in the source block based on the loaded part of the plurality of sub-mapping tables,
wherein the sub-bitmap corresponding to the source block includes valid information of the plurality of sub-mapping tables with respect to the source block.

9. The nonvolatile memory system of claim 8, wherein the memory controller is configured to select a destination block from among the plurality of memory blocks, and to copy data in the valid pages of the source block to the destination block based on the generated valid page layout.

10. The nonvolatile memory system of claim 9, wherein after the data in the valid pages of the source block is copied to the destination block, the source block is erased.

11. The nonvolatile memory system of claim 8, wherein when at least one memory block among the plurality of memory blocks is updated, the memory controller is configured to update a sub-bitmap of the at least one memory block.

12. The nonvolatile memory system of claim 11, wherein when a part of the mapping table is a valid mapping table with respect to the updated memory block, the memory controller is configured to update a sub-bitmap of the updated memory block such that valid information of the valid mapping table is included in the sub-bitmap of the updated memory block.

13. The nonvolatile memory system of claim 11, wherein when a part of the mapping table is an invalid mapping table with respect to the updated memory block, the memory controller is configured to update the sub-bitmap of the updated memory block such that valid information of the invalid mapping table is not included in the sub-bitmap of the updated memory block.

14. The nonvolatile memory system of claim 11, wherein the memory controller is configured to flush the updated sub-bitmap to the meta area during a background operation.

15. The nonvolatile memory system of claim 8, wherein the memory controller is configured to compare physical addresses included in the loaded part of the plurality of sub-mapping tables with physical addresses of the source block and to generate the valid page layout based on a comparison result.

16. A nonvolatile memory system comprising:
a nonvolatile memory device including a user area and a meta area, the user area being configured to store user data, the user area including a plurality of memory blocks, the meta area being configured to store a mapping table and a bitmap, the mapping table including a plurality of sub-mapping tables, the bitmap including a plurality of sub-bitmaps, each of the plurality of sub-bitmaps corresponding to a respective memory block among the plurality of memory blocks; and
a memory controller configured to control the nonvolatile memory device,
wherein each of the plurality of sub-bitmaps comprises valid information of the plurality of sub-mapping tables,
the memory controller is configured to load a part of the plurality of sub-mapping tables based on a sub-bitmap from among the plurality of sub-bitmaps corresponding to at least one memory block among the plurality of memory blocks,
the memory controller is configured to generate a valid page layout constituted by valid pages among a plurality of pages included in the at least one memory block based on the loaded part of the plurality of sub-mapping tables, and
the memory controller is configured to perform a garbage collection based on the valid page layout.

17. The nonvolatile memory system of claim 16, wherein each of the plurality of sub-mapping tables includes address translation information of the user data stored in the user area.

18. The nonvolatile memory system of claim 16, wherein the plurality of sub-mapping tables comprise information on mapping between a logical address received from an external device and a physical address of a plurality of pages of the plurality of memory blocks.

19. The nonvolatile memory system of claim 16, wherein the memory controller is configured to select a destination block from among the plurality of memory blocks, and to copy the valid pages to the destination block based on the valid page layout.

20. The nonvolatile memory system of claim 19, wherein after completing copying the valid pages, the memory controller is configured to erase at least one memory block among the plurality of memory blocks.

* * * * *